（12）United States Patent
Chertok et al.

(10) Patent No.: US 8,401,312 B2
(45) Date of Patent: Mar. 19, 2013

(54) METHOD AND A SYSTEM FOR ORGANIZING AN IMAGE DATABASE

(75) Inventors: Michael Chertok, Tel Aviv-Yafo (IL); Adi Pinhas, Hod Hasharon (IL); Yossi Keller, Rehovot (IL)

(73) Assignee: Superfish Ltd., Petach Tikva (IL)

( * ) Notice: Subject to any disclaimer, the term of this patent is extended or adjusted under 35 U.S.C. 154(b) by 548 days.

(21) Appl. No.: 12/596,839

(22) PCT Filed: May 15, 2008

(86) PCT No.: PCT/IL2008/000672
§ 371 (c)(1),
(2), (4) Date: Apr. 21, 2010

(87) PCT Pub. No.: WO2008/142675
PCT Pub. Date: Nov. 27, 2008

(65) Prior Publication Data
US 2010/0209008 A1    Aug. 19, 2010

Related U.S. Application Data

(60) Provisional application No. 60/938,482, filed on May 17, 2007.

(51) Int. Cl.
*G06K 9/36* (2006.01)
*G06K 9/32* (2006.01)
*G06F 17/30* (2006.01)
*H04N 7/12* (2006.01)

(52) U.S. Cl. .. 382/224; 382/232; 382/294; 707/E17.023

(58) Field of Classification Search .................. 382/164, 382/218–220, 224, 181, 305, 162, 165, 103, 382/133–134, 168–173, 271, 276, 232, 248, 382/209, 293, 294, 225; 707/1–6, 999.003, 707/999.104, E17.023, E17.021, 999.005, 707/999.002, 999.001, E17.026; 375/240.19, 375/240.18, E17.024

See application file for complete search history.

(56) References Cited

U.S. PATENT DOCUMENTS

| | | | |
|---|---|---|---|
| 5,893,095 A * | 4/1999 | Jain et al. ............................ | 1/1 |
| 6,359,617 B1 * | 3/2002 | Xiong ............................ | 715/848 |
| 6,532,301 B1 * | 3/2003 | Krumm et al. ................ | 382/170 |
| 6,915,011 B2 | 7/2005 | Loui et al. | |
| 2002/0168108 A1 | 11/2002 | Loui et al. | |
| 2009/0150376 A1 | 6/2009 | O'Callaghan et al. | |

FOREIGN PATENT DOCUMENTS

| EP | 1246085 A2 | 10/2002 |
|---|---|---|
| EP | 1755067 A1 | 2/2007 |

OTHER PUBLICATIONS

Leordeanu M et al., "A Spectral Technique for Correspondence Problems Using Pairwise Constraints" Computer Vision, 2005, ICCV 2005, Tenth IEEE International Conference on Beijing, China Oct. 17-20, 2005, Piscataway, NJ, USA, IEEE, vol. 2, Oct. 17, 2005, pp. 1482-1489, XP010856989 ISBN: 978-0-7695-2334-7 cited in the application p. 1, left-hand column, line 19—right-hand column, line 16 p. 2, left-hand column, line 42—right-hand column.

* cited by examiner

*Primary Examiner* — Sheela Chawan
(74) *Attorney, Agent, or Firm* — Foley Hoag LLP

(57) ABSTRACT

Method for organizing a set of images into subsets of images, the method including the following procedures producing a respective model according to a plurality of feature points and the geometric relations between the feature points for each of the images, determining a similarity index between each pair of the images, according to the respective model of each image of the pair of the images, producing a distance matrix, according to the similarity index between each pair of the images, producing a set of coordinates, according to the distance matrix and sorting the images in plurality of dimensions, according to the set of coordinates.

7 Claims, 7 Drawing Sheets

METHOD AND A SYSTEM FOR ORGANIZING AN IMAGE DATABASE

CROSS REFERENCE TO PRIOR APPLICATIONS

This is a U.S. National Phase application under 35 U.S.C. §371 of International Patent Application No. PCT/IL2008/000672, filed May 15, 2008, and claims the benefit of U.S. Provisional Application No. 60/938,482, filed May 17, 2007 both of which are incorporated by reference herein. The International Application published in English on Nov. 27, 2008 as WO 2008/142675 under PCT Article 21(2).

FIELD OF THE DISCLOSED TECHNIQUE

The disclosed technique relates to content-based classification of images, in general, and to methods and systems for organizing a database of images into subsets of images, according to similarity of the content of the images, and to organizing series of panoramic images in a correct order thereof, in particular.

BACKGROUND OF THE DISCLOSED TECHNIQUE

Systems and methods for searching images within a database of images, according to the content of the images are known in the art. A user inputs an image query and a visual characterization for searching a similar image (i.e., similar to the image query) within the database of images. A system for blending a series of panoramic images into a single panorama is also known in the art. The system computes a Laplacian pyramid and a Gaussian pyramid for each of the images. The system blends the Laplacian pyramid and the Gaussian pyramid in the overlapping edge area of each pair of adjacent images out of the series of panoramic images.

U.S. Pat. No. 5,893,095 issued to Jain et al., and entitled "Similarity Engine for Content-Based Retrieval of Images", is directed to a search engine for retrieving images according to their content. The search engine includes a set of primitives, a registration interface, and a comparator. The primitives are coupled with the registration interface and with the comparator.

Each of the primitives includes at least one extraction function, capable of extracting attributes from a visual object and capable of determining similarity between visual objects. The extraction functions of the primitives can extract general attributes (e.g., color, shape, and texture of image), or domain specific attributes (e.g., attributes relevant for cancer cell identification, or face recognition). The primitives express an image as a compact semantic representation of the visual characteristics of the image. The registration interface registers the primitives. The comparator applies the extraction functions of the primitives for comparison of objects.

A user defines at least one primitive. The registration interface registers the primitive and stores the primitive in a look up table. The user inputs an image query. The primitive extracts a feature vector from the image query. The comparator compares the feature vector of the image query with a feature vector of each of a plurality of images stored on an image database, and assigns a similarity score to each of the plurality of images. The search engine retrieves the image with the highest similarity score.

U.S. Pat. No. 6,532,301 B1 issued to Krumm et al., and entitled "Object Recognition with Occurrence Histograms", is directed to a method for finding an object being sought in a search engine. The object finding method includes the following steps capturing model images of the object, generating a plurality of search windows, computing a Co-occurrence Histogram (CH) for each search window, assessing a degree of similarity between each model image CH and each of the search window CH's, and designating a search window.

The model images of the object are captured from a plurality of different viewpoints. Ideally, these different viewpoints are spaced at roughly equal angles from each other around the object. The search windows are generated from a search image (i.e., the image to be searched for the modeled object). The search windows are generated by cordoning the search image into a series of preferably equal sized sub-images (i.e., search windows). These search windows preferably overlap both side-to-side and up-and-down.

A model image CH is computed by generating counts of every pair of pixels whose pixels exhibit colors that fall within the same combination of a series of pixel color ranges and which are separated by a distance falling within the same one of a series of distance ranges. A degree of similarity is assessed by comparing each model image CH and each of the search window CH's. A search window is designated as potentially containing the object being sought, if it is associated with a search window CH, having a degree of similarity to one of the model image CH's, which exceeds a prescribed search threshold.

U.S. Pat. No. 6,359,617 B1 issued to Xiong, and entitled "Blending Arbitrary Overlaying Images into Panoramas", is directed to a method for generating panoramas from two dimensional images. The panoramas generating method includes the steps of storing at least two rectilinear images in a computer memory, constructing a Laplacian pyramid, determining the coarsest resolution level, constructing a Gaussian pyramid, combining the Laplacian pyramid and the Gaussian pyramid.

At least two rectilinear images are stored in a computer memory. A Laplacian pyramid (i.e., an image compression technique in which each level contains less pixels and occupies less space) is constructed for the overlap region of each of the two images. The coarsest resolution level, for blending the two images, is determined according to the inertial tensor of the two images. A Gaussian pyramid is constructed for the overlap region of each of the two images. The Laplacian pyramid and the Gaussian pyramid are combined for blending the two images in the overlap region of the two images.

An article by Marius Leordeanu and Martial Hebert of The Robotics Institute at Carnegie Mellon University, Pittsburgh, entitled "A Spectral Technique for Correspondence Problems Using Pairwise Constraints", is directed to a method for finding consistent correspondence between two sets of feature points. The correspondence method disclosed in the article includes the steps of computing an affinity measure between the descriptors of every assignment of a feature point of the first set with a feature point of the second set, computing an affinity measure of the compatibility of every pair of assignments of feature points of the two sets, constructing an affinity matrix, computing the principal eigenvector of the affinity matrix, construct the solution vector.

In the first step, an affinity measure between the descriptors of every assignment of a feature point of the first set with a feature point of the second set is computed. For example, two sets including two points each (i.e., a first set of points one and two and a second set of points three and four) will result in four such affinity measures between descriptors, points one and three, points one and four, points two and three, and points two and four.

In the second step, an affinity measure of the compatibility of every pair of assignments of feature points of the two sets is computed. In the example herein above the affinity measure of the compatibility of assignment of points one and three with assignment of points two and four is computed. In the third step, an affinity matrix is constructed, such that the affinity matrix includes all the affinity measures of the compatibility of pairs of assignments.

In the forth step, the principal eigenvector of the affinity matrix is determined. In the fifth step, solution vector is computed. The assignment corresponding to the highest magnitude entry within the principal eigenvector is determined. The entry of the solution vector, corresponding to the highest magnitude entry of the principal eigenvector is denoted as one. the assignment corresponding to the highest magnitude is deleted from the set of the assignments. The procedures of the fourth and fifth steps are repeated until the highest magnitude entry equals to the zero.

SUMMARY OF THE PRESENT DISCLOSED TECHNIQUE

It is an object of the disclosed technique to provide a novel system and method for organizing a set of images into subsets of images, according to similarity of the content of the images, and for organizing series of panoramic images in a correct order thereof.

In accordance with the disclosed technique, there is thus provided a method for organizing a set of images into subsets of images. The method includes the following procedures: producing a respective model; determining a similarity index between each pair of the images; producing a distance matrix; producing a set of coordinates; and sorting the images in a plurality of dimensions.

The procedure of producing a respective model is performed according to a plurality of feature points and the geometric relations between the feature points for each of the images. The procedure of determining a similarity index is performed according to the respective model of each image of the pair of the images. The procedure of producing a distance matrix is performed according to the similarity index between each pair of the images. The procedure of producing a set of coordinates is performed according to the distance matrix. The procedure of sorting the images in a plurality of dimensions is performed according to the set of coordinates.

In accordance with another aspect of the disclosed technique, there is thus provided a system for organizing a set of images into subsets of images, according to similarity of the content of the images, and for organizing series of panoramic images in a correct order thereof. The system includes a database and a processor. The database stores the set of images.

The processor produces a respective model, for each of the images, according to a plurality of feature points and the geometric relations between the feature points. The processor determines a similarity index between each pair of the images, according to the respective model of each image of the pair of the images. The processor produces a distance matrix, according to the similarity index between each pair of the images. The processor produces a set of coordinates, according to the distance matrix. The processor sorts the images in plurality of dimensions, according to the set of coordinates.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by automatically organizing a database of images into subsets of images, according to a similarity index between each pair of images (i.e., similarity of image content, such as similar objects, panorama set images, and the like). A system, operating according to the disclosed technique, produces a respective model of each of the images, according to a plurality of feature points and the geometrical relations between these feature points. The system determines a similarity index for each pair of images. The system sorts the images according to the determined similarity indexes. The system organizes subsets of images, corresponding to a panoramic image set, in the correct order.

The term "feature point" as described herein below, refers to a point in an image, where there are sharp variations in pixel values, due to physical features depicted in the image, such as an intersection of physical elements, a hole, and the like (i.e., an interest point). The term "geometric relation" as described herein below, refers to the relative geometric position of a first feature point in relation to a second feature point. The geometric relation is defined by the distance between the first feature point and the second one. It is noted that, multi-scale and orientation invariant feature point detectors, which are known in the art, can produce a set of feature points within an image.

The term "respective graph model" as described herein below, refers to a representation of a shape of an object within an image as a graph, according to the feature points of the image, and the geometrical relations between the feature points of that image. A respective graph model of an image can further include a local similarity descriptor for each feature point.

The local similarity descriptors are employed in order to decide which of a plurality of points of a first image can be related to which of a plurality of points of a second image. In this manner, there is no need of examining each point in the first image against all of the points in the second image. The local descriptor is employed in order to make the affinity matrix, which is created when comparing two images, sparse, since most of the pairs of feature points are substantially non-related (i.e., the affinity between the pair of feature points is zero).

Figure 1:
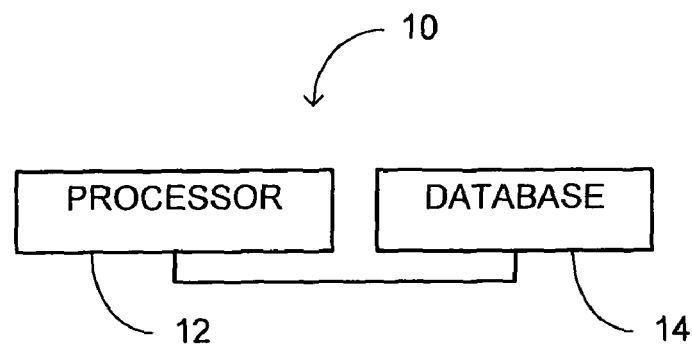
FIG. 1 is a schematic illustration of a system for organizing a database of images into subsets of images according to the image content, constructed and operative in accordance with an embodiment of the disclosed technique.
Figure 2:
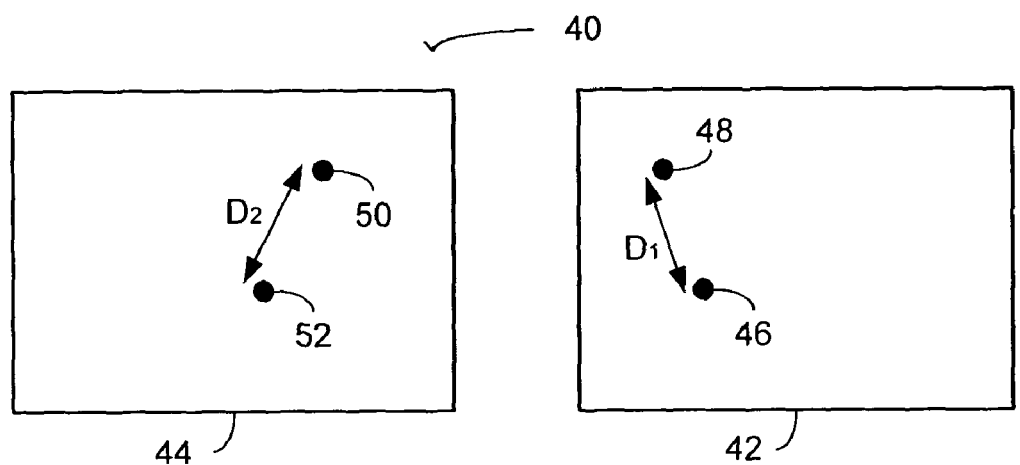
FIG. 2 is a schematic illustration of a first image and a second image, modeled and compared to each other in accordance with another embodiment of the disclosed technique.

Reference is now made to FIGS. 1 and 2. FIG. 1 is a schematic illustration of a system, generally referenced 10, for organizing a database of images into subsets of images according to the image content, constructed and operative in accordance with an embodiment of the disclosed technique. FIG. 2 is a schematic illustration of a first image, generally referenced 42, and a second image, generally referenced 44. Both first image 42 and second image 44 are modeled (i.e., a respective model is produced for both images) and compared to each other in accordance with another embodiment of the disclosed technique.

With reference to FIG. 1, Image organization system 10 includes a processor 12, and a database 14. Processor 12 is coupled with database 14. Processor 12 can further be coupled to an image digitizer (not shown). The image digitizer digitizes a set of images and stores the set of images within database 14. Processor 12 produces a respective model of each of the images according to a plurality of feature points within each of the images, and according to the geometric relations between these feature points. Processor 12 can further include in the respective graph model of each image a local descriptor, corresponding to each feature point in the respective graph model. Processor 12 determines a similarity index between each pair of the images.

Processor 12 produces a matrix of distances D (not shown) between the set of images, according to the similarity index between each pair of images. Processor 12 further produces an affinity matrix A (not shown), according to the distance matrix D. The affinity matrix A is embedded in order to produce a set of coordinates (not shown) for the set of images. Processor 12 associates two coordinates, of the set of coordinates, with each of the set of images, according to the embedding of the affinity matrix A. The two coordinates, associated with each image, reflect the state of the image, within the set of images. For instance, a set of images within a panorama is aligned in a curve-like structure.

Processor 12 analyzes the set of coordinates according to the distance matrix D. Processor 12 identifies subsets of images according to the set of coordinates. There are two types of image subsets, a similar object subset and a panoramic image subset. Processor 12 organizes each of the panoramic image subsets according to the order of images within the panorama.

With reference to FIG. 2, first image 42 includes a first set of feature points 46 and 48. Second image 44 includes a second set of feature points 50 and 52. Processor 12 (FIG. 1) produces a respective model of first image 42 according to first set of feature points 46 and 48, and according to the geometric relations between them. Processor 12 produces a respective model of second image 44 according to second set of feature points 50 and 52, and according to the geometric relations between them.

Figure 3:
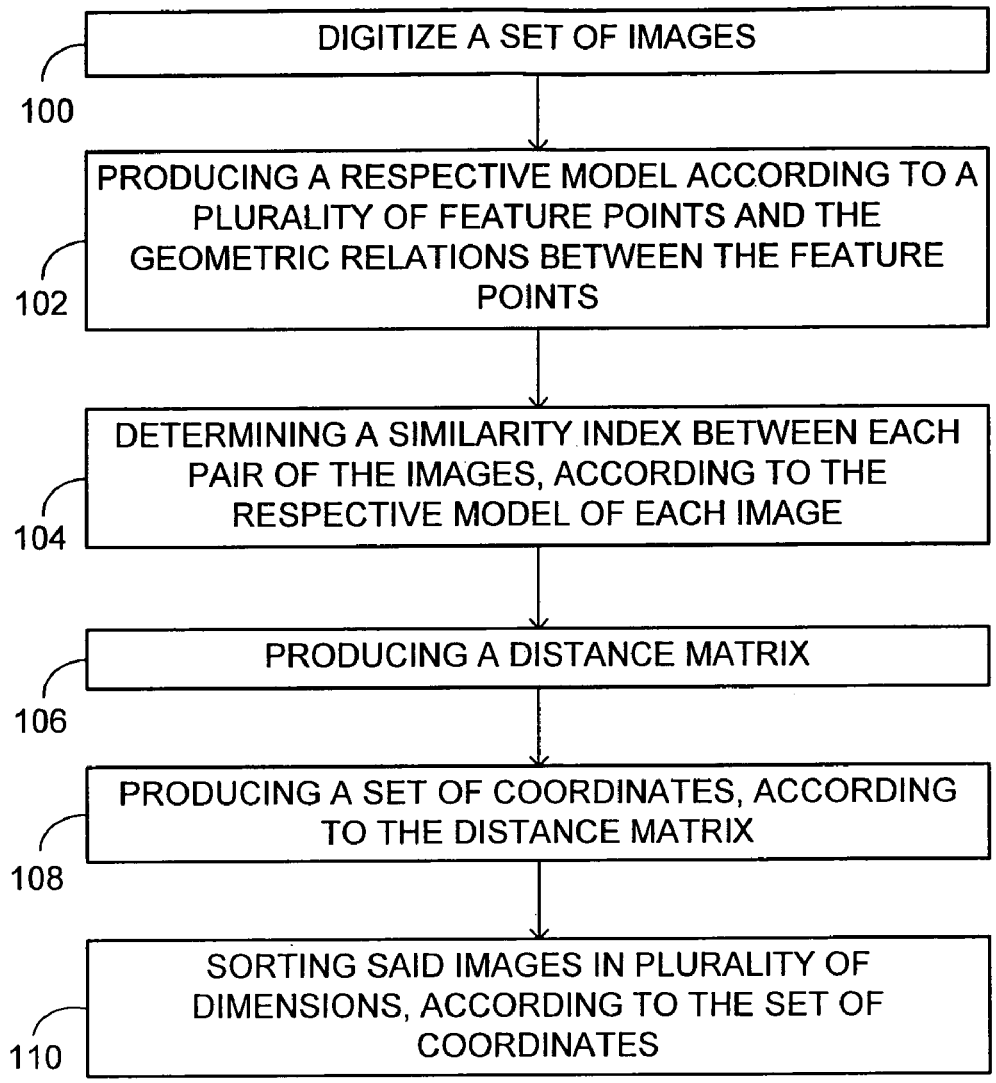
FIG. 3 is a schematic illustration of a method for organizing a database of images into subsets of images according to the image content, operative in accordance with a further embodiment of the disclosed technique.
Figure 4:
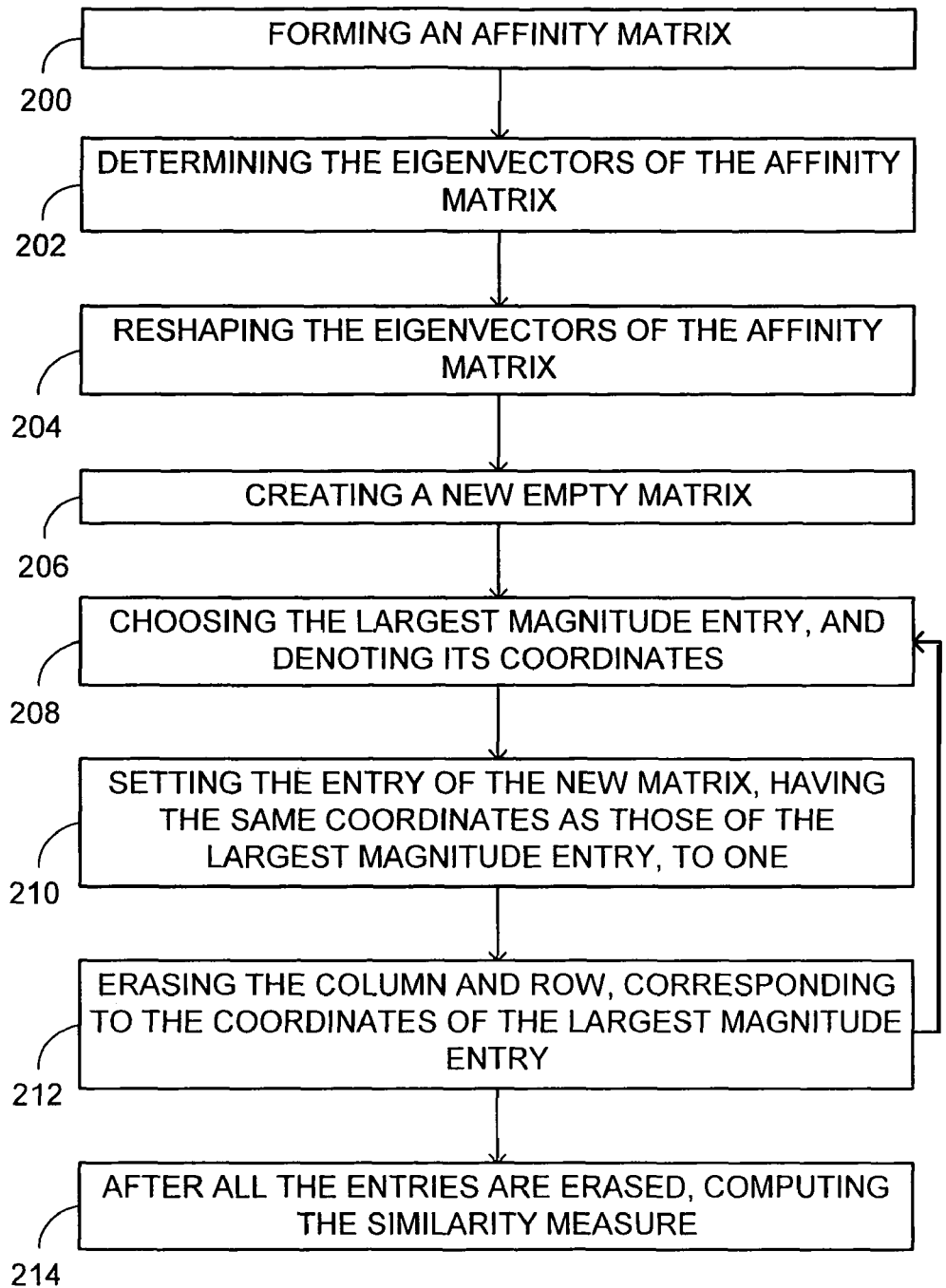
FIG. 4 is a schematic illustration of a method for determining a similarity index between a pair of images according to the respective graph model of each of the images, operative in accordance with another embodiment of the disclosed technique.
Figure 5:
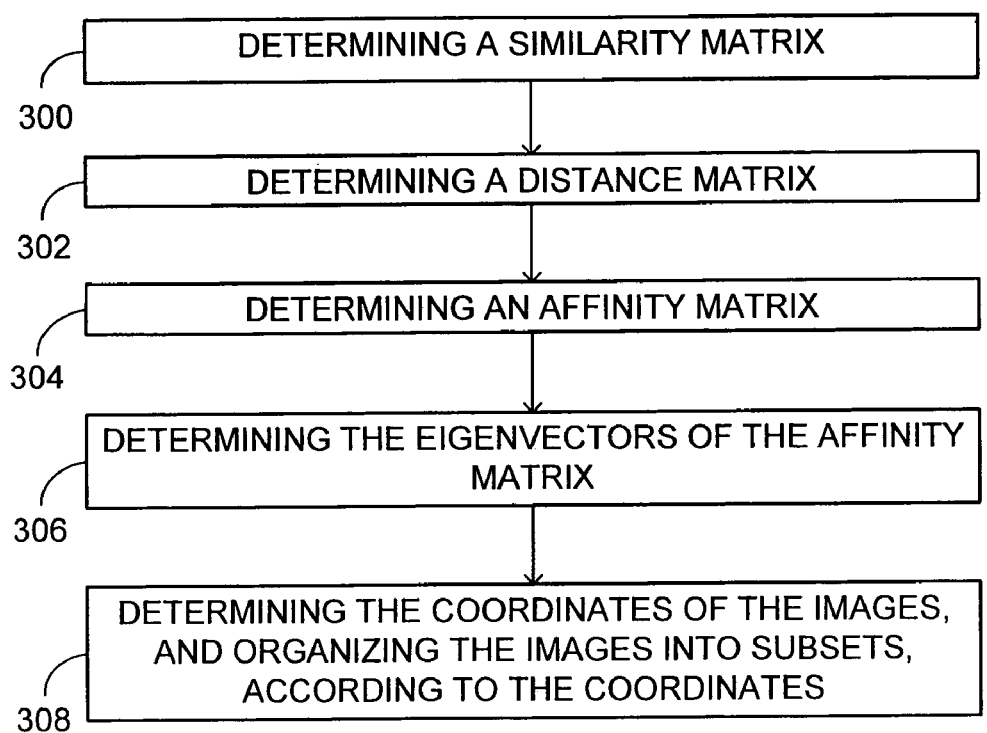
FIG. 5 is a schematic illustration of a method for identifying subsets of images within a database of images, operative in accordance with a further embodiment of the disclosed technique.
Figure 6A:
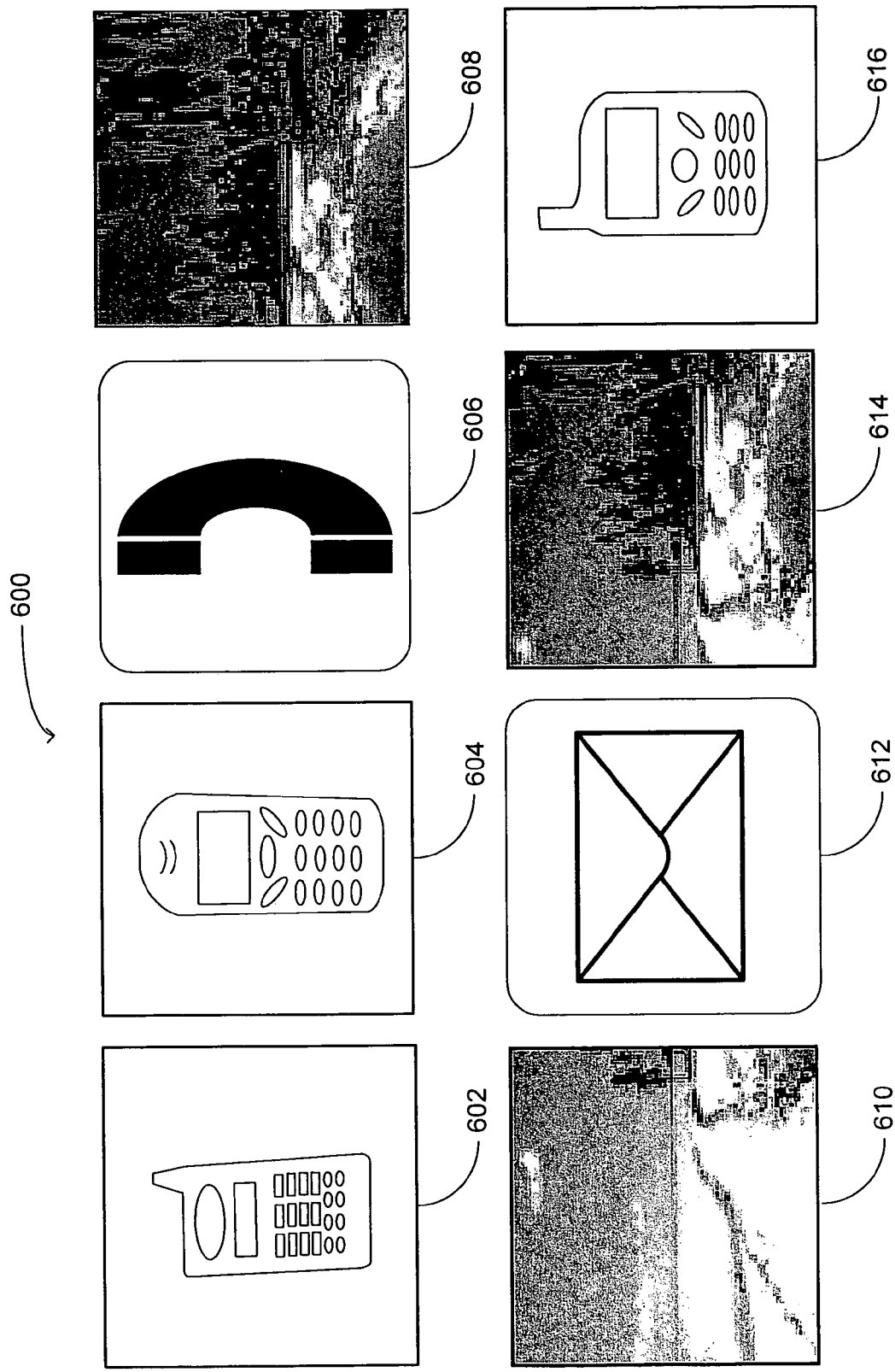
FIG. 6A is a schematic illustration of a set of unsorted images constructed and operative in accordance with another embodiment of the disclosed technique.
Figure 6B:
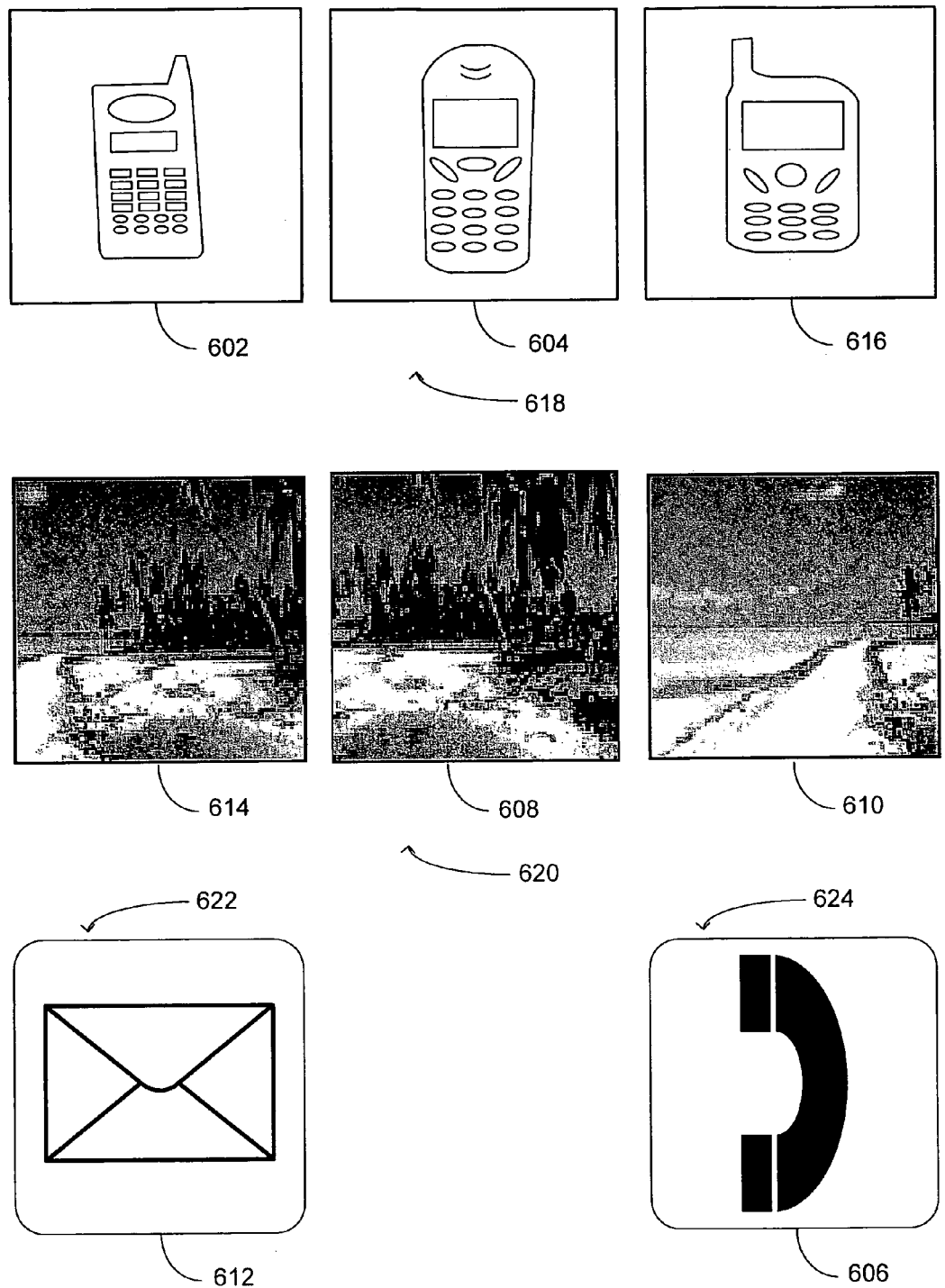
FIG. 6B is a schematic illustration of the set of images of FIG. 6A, organized into subsets in accordance with the method of the disclosed technique.
Figure 6C:
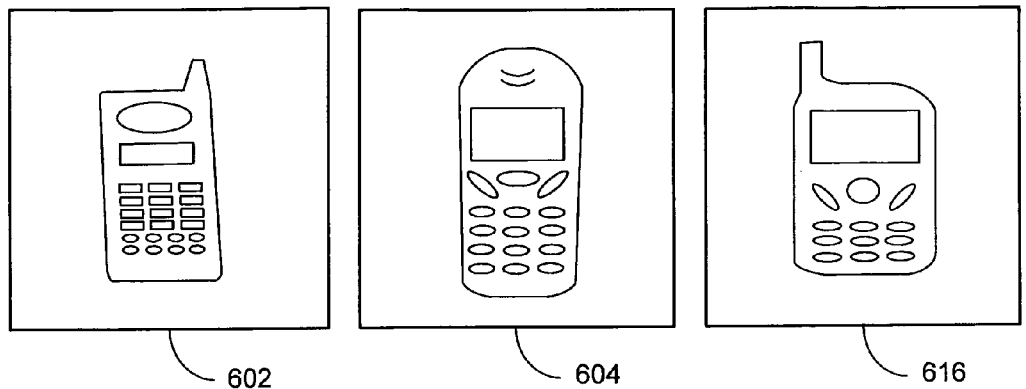
FIG. 6C is a schematic illustration of the organized set of images of FIG. 6B, in which a panoramic image subset is organized according to the respective order of images within the subset, in accordance with the method of the disclosed technique.
Figure 6C:
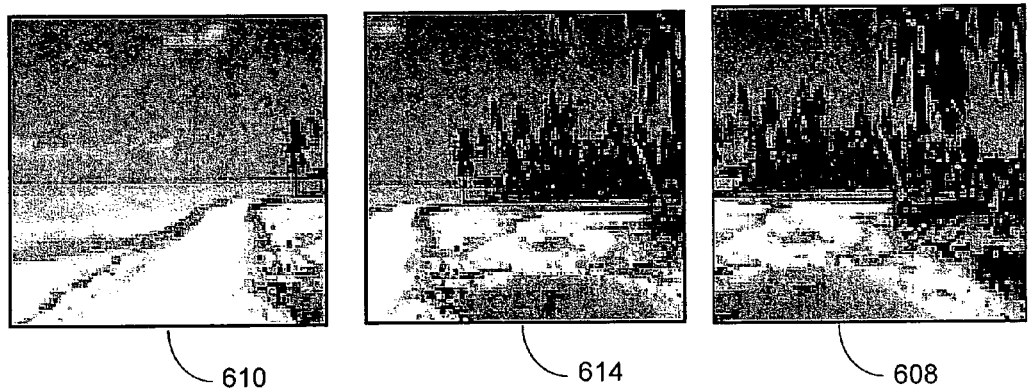
Figure 6C:

Reference is now made to FIGS. 3, 4, 5, 6A, 6B and 6C. FIG. 3 is a schematic illustration of a method for organizing a database of images into subsets of images according to the image content, operative in accordance with a further embodiment of the disclosed technique. FIG. 4 is a schematic illustration of a method for determining a similarity index between a pair of images according to the respective graph model of each of the images, operative in accordance with another embodiment of the disclosed technique. FIG. 5 is a schematic illustration of a method for identifying subsets of images within a database of images, operative in accordance with a further embodiment of the disclosed technique. FIG. 6A is a schematic illustration of a set of unsorted images, generally referenced 600, constructed and operative in accordance with another embodiment of the disclosed technique. FIG. 6B is a schematic illustration of the set of images of FIG. 6A, organized into subsets in accordance with the method of the disclosed technique. FIG. 6C is a schematic illustration of the organized set of images of FIG. 6B, in which a panoramic image subset, generally referenced 620, is organized according to the respective order of images within the subset, in accordance with the method of the disclosed technique.

With reference to FIG. 3, in procedure 100, a set of images is digitized and stored on a database. With reference to FIGS. 1 and 6A, an image digitizer (e.g., a scanner—not shown) digitizes a set of images 600 and stores set of images 600 on database 14. In procedure 102, a respective graph model is produced for each of the images according to a plurality of feature points within each of the images, and according to the geometric relations between these feature points. The respective graph model of each image corresponds to the geometric shape of the object of the relevant image. It is noted that, the respective graph model for each of the images can be produced by image modeling techniques based on local features within multi-scale framework, as known in the art.

With reference to FIGS. 1 and 2, processor 12 produces a first respective graph model (not shown) for first image 42, according to the geometric relations between first set of feature points 46 and 48. Processor 12 produces a second respective graph model (not shown) for second image 44, according to the geometric relation between second set of feature points 50 and 52.

In procedure 104, a similarity index is determined for each pair of the images, by modeling their geometrical similarity as a geometrical similarity graph. The similarity index for each pair of images is determined by analyzing the geometrical similarity graph of the pair of images. The determination of the similarity index is further explained with conjunction to FIG. 4. In procedure 106, a distance matrix D is produced, according to the similarity index between each pair of images. The production of the distance matrix is further explained in conjunction with FIG. 5.

In procedure 108, a set of coordinates is produced and analyzed, and image subsets are identified. The set of images is embedded into a two-dimensional Euclidean space (i.e., embedding is the task of associating the set of coordinates to the set of images). The set of coordinates represents the inner structure of the image set. The set of coordinates is produced and analyzed according to the distance matrix. The image subsets are identified according to the set of coordinates. The analysis of the coordinates and the identification of image subsets are further explained with conjunction to procedure 308 of FIG. 5.

In procedure 110, the set of images is sorted, in a plurality of dimensions, according to the set of coordinates. With reference to FIGS. 1, 6A, and 6B, processor 12 sorts image set 600, into image subsets 618, 620, 622, and 624 according to the set of coordinates.

With reference to FIG. 4, in procedure 200, an affinity matrix A (not shown) is formed. With reference to FIGS. 1 and 2, processor 12 forms an affinity matrix A according to the distance matrix D. Processor 12 defines the distance between feature point 46 and feature point 48 as $D_1$. Processor 12 defines the distance between feature point 50 and feature point 52 as $D_2$. Processor 12 forms the affinity matrix A as:

$$A = \exp[-(D_1 - D_2)/\text{sigma}] \quad (1)$$

In procedure 202, a set of eigenvectors of the affinity matrix are determined. With reference to FIG. 1, Processor 12 determines a set of eigenvectors Y (not shown) of the affinity matrix A. In procedure 204, the eigenvectors of the affinity matrix are reshaped to form a matrix of predetermined dimensions. With reference to FIGS. 1 and 2, Processor 12 reshapes the eigenvectors Y into a matrix of $N_1 \times N_2$, such that the rows of the reshaped Y correspond to feature points 44 and 46 of first image 42 (i.e., $N_1$ equals two). $N_1$ is a number of interest points in the first image. $N_2$ is a number of interest points in the second image, which are put in possible correspondence to the $N_1$ points in the first image.

In procedure 206, a new empty matrix is created. With reference to FIG. 1, processor 12 creates a new empty matrix Z (not shown), such that the dimensions of Z match the dimensions of the reshaped eigenvectors Y. In procedure 208, the largest magnitude entry is chosen and its coordinates are denoted. With reference to FIG. 1, processor 12 determines which entry of eigenvectors Y is of the largest magnitude, and denotes the coordinates of the largest magnitude entry as $(a_1, a_2)$.

In procedure 210, an entry of the new matrix, having the same coordinates as those of the largest magnitude entry, is set to one. With reference to FIG. 1, processor 12 sets $Z(a_1, a_2) = 1$. In procedure 212, the row and column, corresponding to the coordinates of the largest magnitude entry, are erased from the reshaped eigenvector. With reference to FIG. 1, processor 12 erases the row and column corresponding to the coordinates $(a_1, a_2)$ of the reshaped Y (i.e., the row of $a_1$ and the column of $a_2$).

Processor 12 repeats procedures 208 through 212 until no more entries remain in eigenvectors Y. In procedure 214, the similarity index between each pair of images is determined. With reference to FIGS. 1 and 2, processor 12 reshapes Z into a column vector $(N_1 \times N_2) \times 1$. Processor 12 defines a similarity index (not shown) between first image 42 and second image 44 as:

$$\text{Similarity} = \frac{Z^T A Z}{N_1} \quad (2)$$

it is noted that, the similarity index between first image 42 and second image 44, as determined herein above, is normalized by a normalization factor of $N_1$.

With reference to FIG. 5, in procedure 300, a similarity matrix is determined, according to a set of similarity indexes between each pair of images. With reference to FIG. 1, processor 12 determines a similarity matrix S according to the similarity index between each pair of images, determined as described in conjunction with FIG. 4.

In procedure 302, a distance matrix is determined from the similarity matrix. With reference to FIG. 1, processor 12 determines a distance matrix D (not shown) from the similarity matrix S. Processor 12 defines D as:

$$D = 1./S$$

$$D(i,i) = 0 \quad (3)$$

(i.e., "./" denotes a pointwise operation).

In procedure 304, a general affinity matrix G is determined, according to the distance matrix. With reference to FIG. 1, processor 12 determines a general affinity matrix G according to the distance matrix D. Processor 12 defines the general affinity matrix G as:

$$G = \exp[-D/\text{sigma}] \quad (4)$$

In procedure 306, the eigenvectors of the general affinity matrix G are determined. With reference to FIG. 1, processor 12 determines the eigenvectors U of the general affinity matrix G. In procedure 308, the coordinates of the images are determined from the eigenvectors of the general affinity matrix G, and at least one subset of images is identified, according to the coordinates of the images. With reference to FIG. 1, processor 12 denotes the entries of the first two columns of the eigenvectors U as the coordinates of the images. Processor 12 identifies at least one subset of images according to the coordinates of the images.

With reference to FIG. 6A, a set of images 600 includes eight images, first cell phone 602, second cell phone 604, phone sign 606, first beach 608, second beach 610, envelope 612, third beach 614, and third cell phone 616. The images of set 600 are not organized according to their content. Processor 12 (FIG. 1) produces a respective graph model (not shown) corresponding to each of images 602, 604, 606, 608, 610, 612, 614, and 616 (i.e., a single graph model for each image), according to a plurality of feature points (not shown) and according to the geometric relations between these feature points. Processor 12 determines a similarity index for each pair of images 602, 604, 606, 608, 610, 612, 614, and 616.

With reference to FIG. 6B, processor 12 sorts the images of set 600 into four subsets, 618, 620, 622, and 624, according to the similarity index between each pair of images as described herein above with reference to FIG. 3. Subset 618 includes first cell phone 602, second cell phone 604, and third cell phone 616. Subset 618 is a similar object image subset. Subset 620 includes first beach 608, second beach 610, and third beach 614. Subset 620 is a panoramic image subset. Subset 622 includes envelope 612. Subset 624 includes phone sign 606.

With reference to FIG. 6C, processor 12 organizes subset 620 according to the order of images within the panoramic image, as described herein above with reference to FIG. 3. Processor 12 organizes subset 620 such that second beach 210, third beach 214, and first beach 208 are positioned as the left portion, middle portion, and right portion of a single panoramic image (not shown), respectively. It is noted that, the organization scheme, of panoramic image subsets, applies to both a single panorama and to a multi-row panorama. It will be appreciated by persons skilled in the art that the disclosed technique is not limited to what has been particularly shown and described hereinabove. Rather the scope of the disclosed technique is defined only by the claims, which follow.

The invention claimed is:

1. Method for organizing a set of images into subsets of images, the method comprising the procedures of:
   for each of said images, producing a respective model according to a plurality of feature points and the geometric relations between said feature points;
   determining a similarity index between each pair of said images, according to said respective model of each image of said pair of said images;
   producing a distance matrix, according to said similarity index between each pair of said images and determining a set of eigenvectors of said distance matrix;

associating each of said images with respective image coordinates in a two-dimensional Euclidean space thereby embedding said set of images within said two-dimensional Euclidean space, said respective image coordinates of each of said images being determined according to said set of eigenvectors of said distance matrix, said image coordinates of said images representing the inner structure of said images; and sorting said images, according to said image coordinates of each of said images.

2. The method according to claim 1, further comprising a preliminary procedure of digitizing said set of images and storing said set of images on a database.

3. The method according to claim 1, wherein said procedure of determining said similarity index, includes the sub-procedures of:

forming an affinity matrix A according to distances between pairs of feature points in said pair of images;

forming a set of eigenvectors of said affinity matrix A, and reshaping said eigenvectors of said affinity matrix A to form a matrix of eigenvectors of predetermined dimensions $N_1 \times N_2$;

creating a new empty matrix Z;

determining which entry of said matrix of eigenvectors is of the largest magnitude, and denoting the coordinates of said largest magnitude entry;

setting to the value of one, an entry of said new matrix Z, having the same coordinates as those of said largest magnitude entry;

erasing from said matrix of eigenvectors the row and the column, corresponding to the coordinates of said largest magnitude entry;

repeating said procedures of determining largest magnitude entry, setting to one, and erasing the row and the column, until all of the entries of said matrix of eigenvectors are erased; and determining a similarity index according to the following equation:

$$\text{Similarity} = \frac{Z^T A Z}{N_1}.$$

4. The method according to claim 3, wherein N1 is a number of interest points in a first image of said pair of images and N2 is a number of interest points in a second image of said pair of images.

5. The method according to claim 3, wherein said procedure of producing a distance matrix between each pair of said images includes the sub-procedures of:

determining a similarity matrix S according to a set of similarity indexes between each pair of said set of images;

determining a distance matrix D according to said similarity matrix S:

$D = 1./S$ $D(i,i) = 0;$ determining a general affinity matrix G according to said distance matrix D:

$G = \exp[-D/\text{sigma}];$ determining a matrix of eigenvectors U of said general affinity matrix G;

denoting the entries of the first two columns of said eigenvectors matrix U as the coordinates of said images; and identifying at least one said subset of images according to said coordinates of said images.

6. System for organizing a set of images into subsets of images, according to similarity of the content of the images, and for organizing series of panoramic images in a correct order thereof, the system comprising:

a database storing said set of images; and a processor, wherein said processor produces a respective model, for each of said images according to a plurality of feature points and the geometric relations between said feature points, said processor determines a similarity index between each pair of said images according to said respective model of each image of said pair of said images, said processor produces a distance matrix according to said similarity index between each pair of said images and determines a set of eigenvectors of said distance matrix, said processor associates each of said images with respective image in a two-dimensional Euclidean space thereby embedding said set of images within said two-dimensional Euclidean space, said processor determines said respective image coordinates of each of said images according to said set of eigenvectors of said distance matrix, said image coordinates of said images represent the inner structure of said images, said processor sorts said images according to said respective image coordinates of each of said images.

7. The system according to claim 6, further comprising an image digitizer coupled with said database for digitizing said set of images and storing said set of images on said database.

* * * * *